(12) United States Patent
Mitteramskogler et al.

(10) Patent No.: US 12,151,430 B2
(45) Date of Patent: Nov. 26, 2024

(54) DEVICE, MODULAR SYSTEM AND METHOD FOR STEREOLITHOGRAPHIC ADDITIVE MANUFACTURING

(71) Applicant: Incus GmbH, Vienna (AT)

(72) Inventors: Gerald Mitteramskogler, Vienna (AT); Manuel Grubhofer, Vienna (AT); Christian Veigl, Vienna (AT)

(73) Assignee: Incus GmbH, Vienna (AT)

( * ) Notice: Subject to any disclaimer, the term of this patent is extended or adjusted under 35 U.S.C. 154(b) by 0 days.

(21) Appl. No.: 17/970,682

(22) Filed: Oct. 21, 2022

(65) Prior Publication Data

US 2023/0127618 A1 Apr. 27, 2023

(30) Foreign Application Priority Data

Oct. 22, 2021 (EP) .................................. 21020523

(51) Int. Cl.
*B29C 64/245* (2017.01)
*B22F 10/12* (2021.01)
(Continued)

(52) U.S. Cl.
CPC .......... *B29C 64/124* (2017.08); *B29C 64/214* (2017.08); *B29C 64/245* (2017.08);
(Continued)

(58) Field of Classification Search
CPC ... B29C 64/124; B29C 64/214; B29C 64/245; B33Y 10/00; B33Y 30/00; B22F 12/38; B22F 12/80
See application file for complete search history.

(56) References Cited

U.S. PATENT DOCUMENTS

| 8,308,466 B2 * | 11/2012 | Ackelid ................ B29C 64/153 |
| | | 425/375 |
| 2007/0026099 A1 * | 2/2007 | Hagiwara ............. B29C 64/153 |
| | | 425/174.4 |

(Continued)

FOREIGN PATENT DOCUMENTS

| DE | 102009036153 A1 | 2/2011 |
| EP | 1704989 A2 | 9/2006 |
| EP | 3702052 A1 | 9/2020 |

OTHER PUBLICATIONS

Extended European Search Report received in 21020523.3 dated Mar. 25, 2022, pp. 8.

(Continued)

*Primary Examiner* — Galen H Hauth
*Assistant Examiner* — Baileigh Kate Darnell
(74) *Attorney, Agent, or Firm* — Liang & Hennessey LLP; Brian Hennessey

(57) ABSTRACT

A device for the stereolithographic additive manufacturing of metallic components includes a material support for a material layer of a material to be polymerized, the surface of which forms a building plane, a material container for fresh material, which opens into the building plane via a material feed opening, a build platform movable between a position flush with the building plane and a lowered position perpendicular to the building plane, a doctor blade movable between the material container and the build platform for applying the material layer on the building plane, and an exposure unit for position-selective exposure of the material layer on the build platform or on a component partially built on the build platform. The material support is exchangeably arranged in the device.

13 Claims, 12 Drawing Sheets

(51) Int. Cl.
  *B22F 12/30*     (2021.01)
  *B29C 64/124*    (2017.01)
  *B29C 64/214*    (2017.01)
  *B33Y 10/00*     (2015.01)
  *B33Y 30/00*     (2015.01)
  *B29K 505/00*        (2006.01)

(52) U.S. Cl.
  CPC ............... *B33Y 10/00* (2014.12); *B33Y 30/00* (2014.12); *B29K 2505/00* (2013.01)

(56) References Cited

U.S. PATENT DOCUMENTS

| | | | |
|---|---|---|---|
| 2007/0075461 A1* | 4/2007 | Hunter | B29C 64/245 |
| | | | 425/174 |
| 2017/0334140 A1* | 11/2017 | Andersson | B29C 64/357 |
| 2018/0236549 A1* | 8/2018 | Spears | B22F 12/90 |
| 2019/0126544 A1* | 5/2019 | Martin Vidal | B33Y 40/00 |
| 2020/0061915 A1* | 2/2020 | Pawliczek | B29C 64/153 |
| 2020/0101666 A1 | 4/2020 | Saharan et al. | |

OTHER PUBLICATIONS

Powder Injection Moulding International, "Smale-Scale, Complex Parts with a Fine Surface Finish: An AM Solution from Incus Meets the Demands of MIM Producers", Communications Ltd, vol. 14, No. 4, Dec. 2020, pp. 101-107.

* cited by examiner

DEVICE, MODULAR SYSTEM AND METHOD FOR STEREOLITHOGRAPHIC ADDITIVE MANUFACTURING

CROSS-REFERENCE TO RELATED APPLICATIONS

The present application is a Paris Convention corresponding application of European Application No. 21 020 523.3, filed Oct. 22, 2021, entitled "DEVICE, MODULAR SYSTEM AND METHOD FOR STEREOLITHOGRAPHIC ADDITIVE MANUFACTURING", which is incorporated by reference in its entirety.

BACKGROUND OF THE INVENTION

1. Field of the Invention

The invention relates to a device for stereolithographic additive manufacturing of metallic components.

The invention further relates to a modular system for stereolithographic additive manufacturing of metallic components and a method for additively manufacturing a metallic component using the modular system.

2. Description of the Related Art

In stereolithographic additive manufacturing of metallic components, the component is made by polymerizing a metal-filled photopolymerizable slurry layer by layer, separating the resulting green body from the surrounding unpolymerized material, and then firing it in a furnace, which burns off the organic polymerized material. A metallic body remains, which is finally sintered.

Each layer of the component is obtained on a material support defining a building plane by the following process steps: The material support includes a material feed opening through which a quantity of material is brought from a material container to the building plane. The material is then doctored up using a doctor blade to form a layer of material on the material support that extends from the material feed opening to over the build platform, which is flush with the building plane. In the area of the build platform, the material layer is exposed position selectively from above using an exposure unit to obtain a position selectively polymerized component layer, leaving an unpolymerized amount of material around the component layer. The build platform with the component layer and the unpolymerized material on the build platform is then lowered by an amount corresponding to the thickness of the component layer. In the lowered state, the last component layer produced is thus flush with the building plane. For the production of the next component layer, the steps described are repeated, i.e. a new amount of material is brought to the building plane and applied by means of the doctor blade, with the new material layer extending over the previously produced component layer in the area of the build platform. After completion of the process, a green body is obtained which has been built up from a large number of position-selectively polymerized component layers and which is embedded in unpolymerized material. The unpolymerized material must be removed from the component and cannot be readily reused.

In the additive manufacturing machines currently offered for metallic materials, the size of the build space defined by the size of the build platform (corresponding to the x and y directions) is fixed and not variable. Only the component height (corresponding to the z-direction) has a direct influence on the material consumption, while the base area remains unchanged. This results in a minimum consumption of the required material, which is independent of the extension of the component in x- and y-direction and which cannot be reduced further.

In the field of material development, especially for expensive alloys or precious metals, this circumstance leads to additional costs. It can be assumed that several test runs will be necessary in the course of development. Even in the case of standardized test specimens for checking component strength (tensile tests, etc.), the entire base area of the build space must be filled with material.

If, for example, the machine has a build space of 20×20× 20 cm (x, y, z), this results in a minimum material consumption of 20 cm×20 cm×0.5 cm=200 cm$^3$ for a test specimen with a thickness of 0.5 cm (in the z direction), regardless of the number of test specimens.

Adding to the minimum material consumption is the fact that in some additive manufacturing processes only 50% of the unpolymerized material can be reused.

The invention therefore aims to reduce the consumption of unpolymerized material in an additive manufacturing process.

SUMMARY OF THE INVENTION

In order to solve this problem, the invention essentially provides, in a device of the type mentioned above, that the material support is arranged in the device in an exchangeable manner.

In particular, the invention relates to a device for stereolithographic additive manufacturing of metallic components, comprising
  a material support for a material layer of a material to be polymerized, the surface of which forms a building plane,
  a material container for fresh material, which opens into the building plane via a material feed opening,
  a build platform movable in a direction perpendicular to the building plane between a position flush with the building plane and a lowered position,
  a doctor blade movable between the material container and the build platform for applying the material layer on the building plane, and
  an exposure unit for position-selective exposure of the material layer on the build platform or on a component partially built on the build platform.

Since the material support comprises the material feed opening on the one hand and a recess for flush reception of the build platform on the other had, the size and/or shape of the material feed opening and the size and/or shape of the build platform can be adapted by changing the material support. For this purpose, several material supports can be kept in stock, which have different designs of the material feed opening and the recess for the build platform, and the material support that leads to the lowest material consumption for a certain component size or shape can be installed in the device. For example, for a component with small dimensions in the x and y directions, a material support with smaller dimensions of the material feed opening and the recess for the build platform relative to other material supports is selected.

The material support can preferably be designed as a plate-like component, which can be detachably attached to a frame or a carrier of the device by means of corresponding holders. The detachable or replaceable fastening of the material support is preferably done via a screw connection, which ensures on the one hand a stable fastening and on the other hand an exact positioning, which is advantageous for the precision of the manufacturing process.

By selecting a material support adapted to the shape or dimensions of the component to be produced in such a way that as little unpolymerized material as possible is lowered on the build platform with the respective component layer produced, the amount of unused, i.e. unpolymerized, material discharged from the process area can be minimized.

By choosing a material support in which the material feed opening exceeds the x- and y-extension of the component to be manufactured as little as possible, the amount of freshly fed material is also minimized.

With regard to the material feed, further optimization can preferably be achieved in that not only the material feed opening can be adapted to the respective component by changing the material support, but also the material container. In this context, a preferred further development provides that the material container is arranged below the material feed opening on the material support and is exchangeable together with the material support.

Preferably, the material container has a cylindrical container wall and a container bottom designed as a displaceable piston, with which preferably a drivable lifting and lowering device cooperates for lifting and lowering the container bottom. The moveable container bottom is used here for feeding material via the material feed opening into the building plane. The fact that the container wall is attached to the material support and can therefore be replaced together with it makes it easy to adapt to the shape of the component. For example, depending on the contour of the component, the container wall can be circular cylindrical or a cylinder with a polygonal cross-section, i.e. prismatic. The displaceable container bottom is not part of the material support in this case, but in a preferred design of the device according to the invention it can be separately exchangeable. In particular, it can be provided that the lifting and lowering device comprises a rod which can be raised and lowered and to which the container bottom is interchangeably attached.

According to a preferred design, the material support can be adapted to different build platform sizes or shapes in such a way that the exchangeable material support has a recess corresponding to the shape of the build platform, below which a container for used material is arranged on the material support, which container can be exchanged together with the material support and whose container bottom is formed by the movable build platform.

The build platform, like the moveable bottom of the material container, can be exchangeable independently of the material support. In this context, it is preferably provided that a drivable lifting and lowering device for raising and lowering the build platform cooperates with the build platform, which preferably comprises a raisable and lowerable rod to which the build platform is interchangeably attached.

Finally, the doctor blade may also be adapted to the size and/or shape of the component to be produced in order to reduce material consumption. For this purpose, a preferred further development provides that the device has a holding unit which can be driven to reciprocate parallel to the building plane and to which the doctor blade is exchangeably attached.

According to a second aspect, the invention relates to a modular system for stereolithographic additive manufacturing of metallic components, comprising the manufacturing device described above, which is equipped with a first set and at least one further set of elements, wherein the first set and the at least one further set each comprise a material support, a build platform and optionally a doctor blade, wherein the first set or the at least one further set can selectively be installed and wherein the build platform of the first set and the build platform of the at least one further set have different shapes and/or dimensions from one another and the recess of the associated material support is adapted to the shape or dimensions of the respective build platform.

Preferably, the material feed opening of the material support of the first set and the material feed opening of the material support of the at least one further set have different shapes and/or dimensions from each other.

Preferably, the doctor blades of the first set and the doctor blades of the at least one further set have different dimensions from each other.

According to a third aspect, the invention relates to a method for additive manufacturing of a metallic component using a modular system according to the second aspect of the invention, comprising the steps of:
a) discharging an amount of material from the material container via the material feed opening into the building plane,
b) applying the amount of material by means of the doctor blade to form a material layer on the material support that extends from the material feed opening to over the build platform,
c) position selectively exposing the material layer by means of the exposure unit to obtain a position selectively polymerized component layer, wherein an unpolymerized amount of material remains surrounding the component layer, and
d) lowering of the build platform with the component layer and the unpolymerized amount of material,
   wherein steps a) through d) are repeated to build up the component from a plurality of position-selectively polymerized component layers,
   wherein, prior to producing the component layers such set is selected from the first set and the at least one second set and installed in the device, in which the unpolymerized material quantity to be lowered with the build platform is smaller, taking into account the dimensions of the component to be built up.

BRIEF DESCRIPTION OF THE DRAWINGS

The invention is explained in more detail below with reference to schematic examples of embodiments shown in the drawing. Therein.

DETAILED DESCRIPTION

Figure 1:
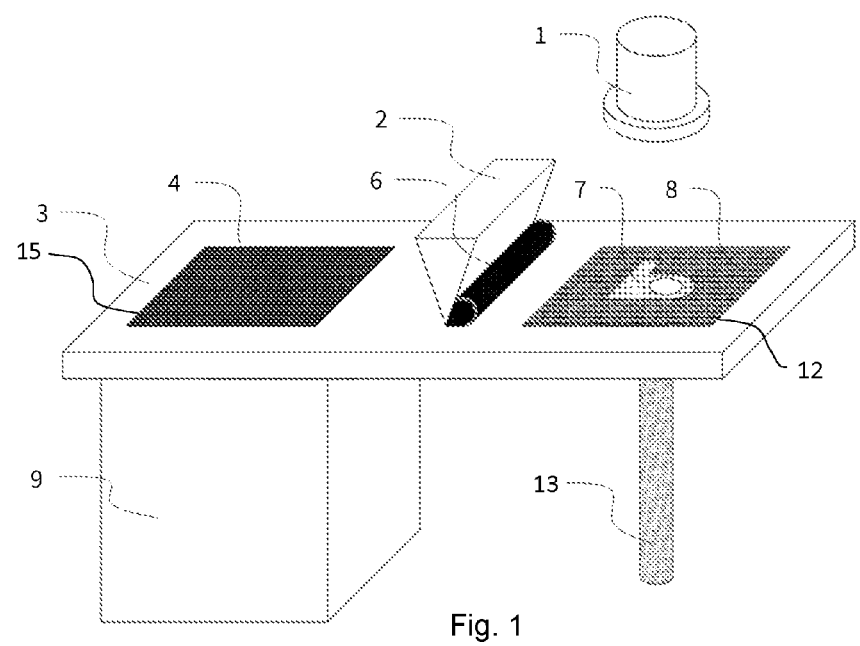
FIG. 1 shows an isometric view of the device according to the invention.

FIG. 1 shows a device according to the invention for additive manufacturing of metallic components. The device comprises a plate-like material support 3, the surface of which forms a building plane. In an area shown on the left in the drawing, the material support 3 has a material feed opening 15 through which material 4 can be brought into the building plane from a material container 9. In the area shown on the right in the drawing, the material support 3 has a recess 12 in which a build platform 11 is accommodated, which can be raised and lowered by means of a rod 13 and a lifting and lowering device not shown. An exposure unit 1 for the position-selective exposure of a material layer is arranged above the build platform 11. The exposure unit 1 can be designed as a DLP projector, for example. In order to layer the material 4 brought from the material container 9 to the building plane, a doctor blade 2 is provided which pushes a material roll 6 in front of it when moving from the material container 9 to the build platform 11.

Figure 2:
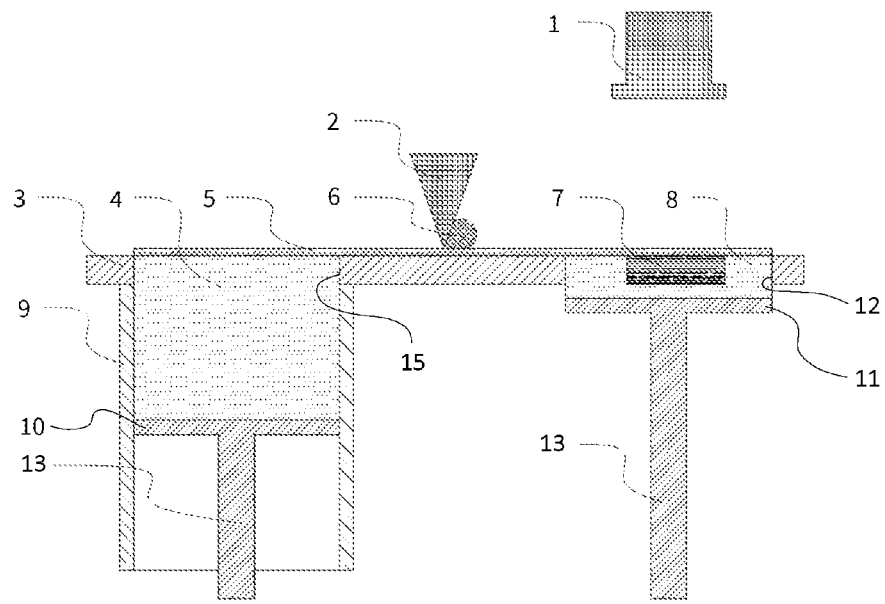
FIGS. 2-4 show the manufacturing of a component layer in several steps.

A component 7 is built up in layers, with several steps being carried out for each layer. First (FIG. 2), material 4 is brought to the building plane via the material feed opening 15 by lifting the container bottom 10 (hereinafter also referred to as the material platform) of the material container 9. This material is conveyed by the doctor blade 2 towards the build platform 11. For this purpose, the material is spread over the surface of the material support 3 as a material roll 6, forming a thin material layer 5 that extends over the build platform 11.

Figure 3:
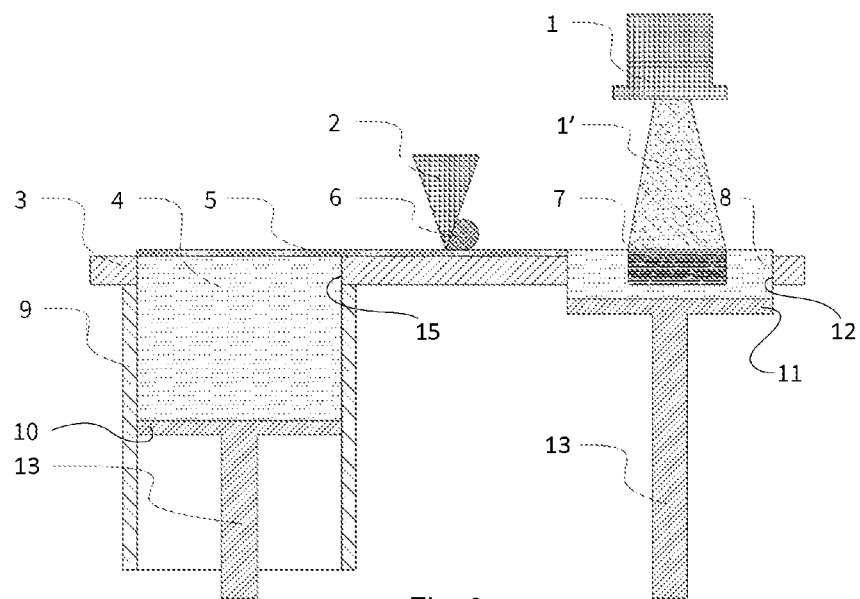

This is followed by exposure 1' of the material layer 5 by means of the exposure unit 1, which results in local curing of the material on the build platform 11 (FIG. 3).

Figure 4:
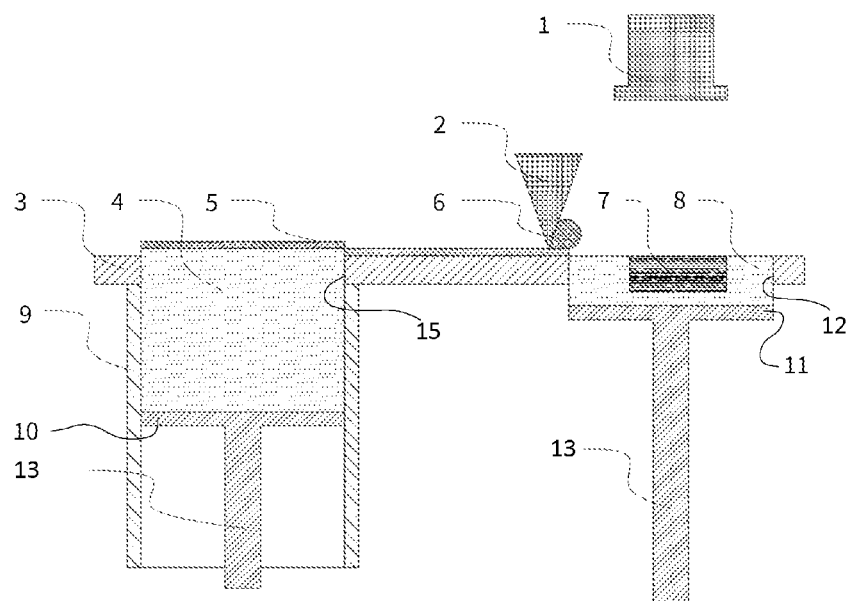

After exposure, the build platform 11 is lowered by a defined height together with the formed component layer and the unpolymerized material 8 surrounding it (FIG. 4).

Further, the material platform 10 is raised to provide new material 4 for the next coating step.

The described steps are repeated until the components, so-called green parts, have been produced layer-by-layer. After fabrication, the green parts are embedded in the unpolymerized material 8 and can be exposed and cleaned by melting off the uncured material. Finally, the green parts are debindered and sintered to obtain the final component properties.

In accordance with the invention, some of the components of the device necessary for the process are interchangeable and variable in geometry to minimize the amount of material 4 discharged from the material container 9 and/or the amount of unpolymerized material 8 lowered with the build platform 11. The interchangeable or adaptable components of the device include the doctor blade 2, the material support 3, the material container 9, the material platform 10, and the build platform 11. The dimensions of the above components can be adapted on a case-by-case basis to the respective use case.

The build- and material platforms 10 and 11 can be adapted in their x- and y-dimensions as well as provided with a free form. The associated cutouts in the material support 3 are adapted to the shape of the build and material platforms 10 or 11.

Figure 5:
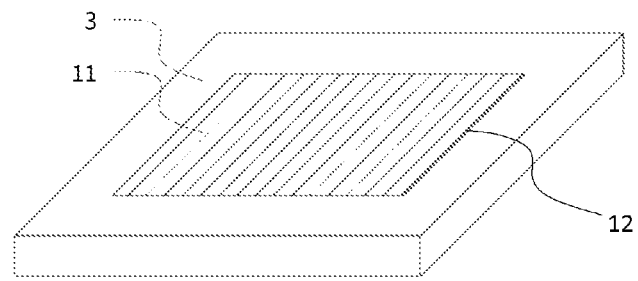
FIG. 5 shows a section of the device with the build platform in a first embodiment.
Figure 6:
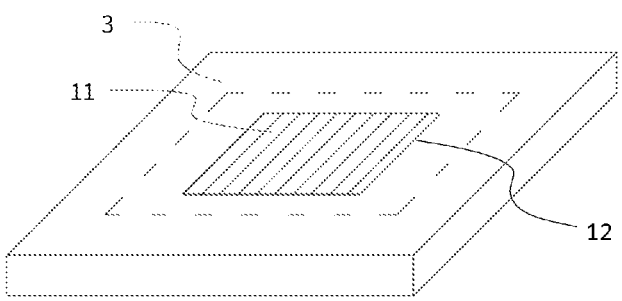
FIG. 6 shows the device according to FIG. 5 in a second embodiment.
Figure 7:
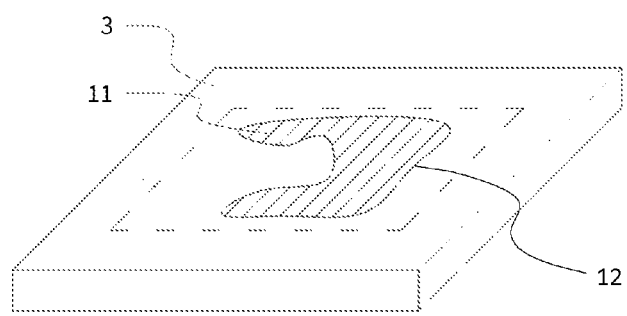
FIG. 7 shows the device according to FIG. 5 in a third embodiment.

FIG. 5 shows a section of the material support 3 with the recess 12 and the build platform 11 received in the recess 12 in the size according to FIGS. 1-4. FIG. 6 shows an embodiment of the material support 3 with adapted, i.e. reduced, size of the build platform 11 as well as of the recess 12 compared to the original size (dashed line). FIG. 7 shows an embodiment of the material support 3 with adapted build platform 11, in which the recess 12 or the build platform 11 is designed to correspond to a free form. For comparison, the original size is shown again with dashed line.

Figure 8:
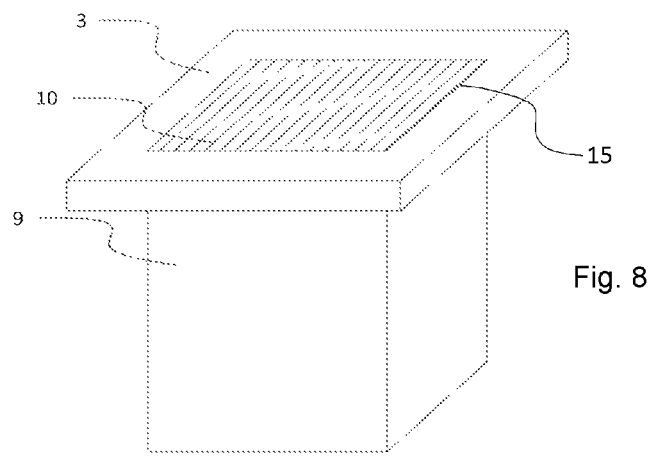
FIG. 8 shows a section of the device with the material platform and the material container in a first embodiment.
Figure 9:
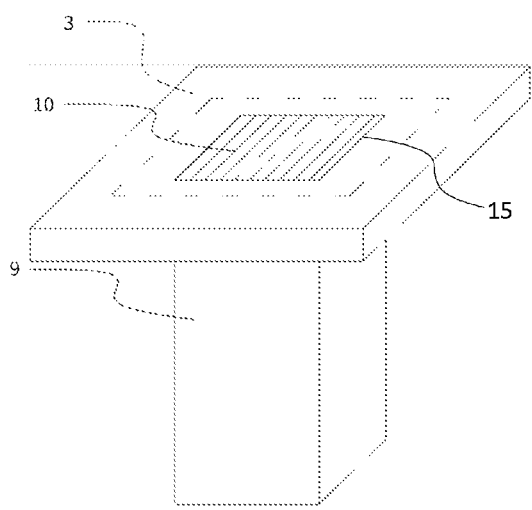
FIG. 9 shows the device according to FIG. 8 in a second embodiment.
Figure 10:
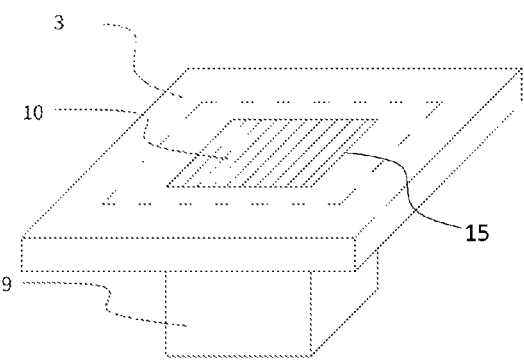
FIG. 10 shows the device according to FIG. 8 in a third embodiment.
Figure 11:
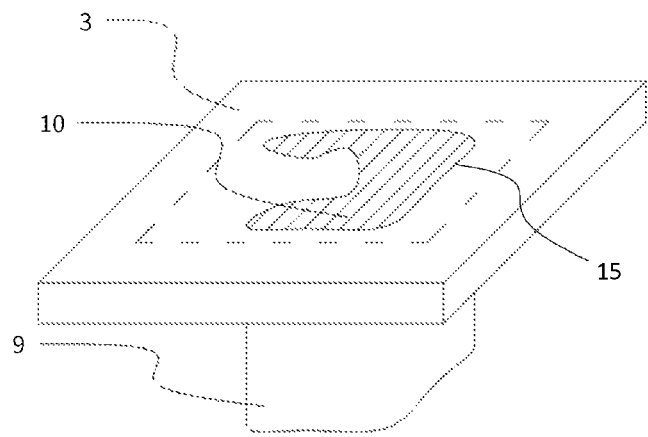
FIG. 11 shows the device according to FIG. 8 in a fourth embodiment.

FIGS. 8 to 11 show the adaptation of the material platform 10 and the material container 9. FIG. 8 shows a section of the material support 3 with the material feed opening 15 and the corresponding material platform 10 in the size according to FIGS. 1-4. FIG. 9 shows an embodiment of the material support 3 with adapted, i.e. reduced, size of the material feed opening 15 as well as of the material container 9, whereby compared to the original size (dashed line) the size in x- and y-direction ha s been adapted. In the embodiment according to FIG. 10, the size of the material container 9 was also adapted in the z-direction. FIG. 11 shows an embodiment of the material support 3 in which the material feed opening 15 and the material container 9 are designed according to a free form. For comparison, the original size is shown again with dashed line.

Figure 12:
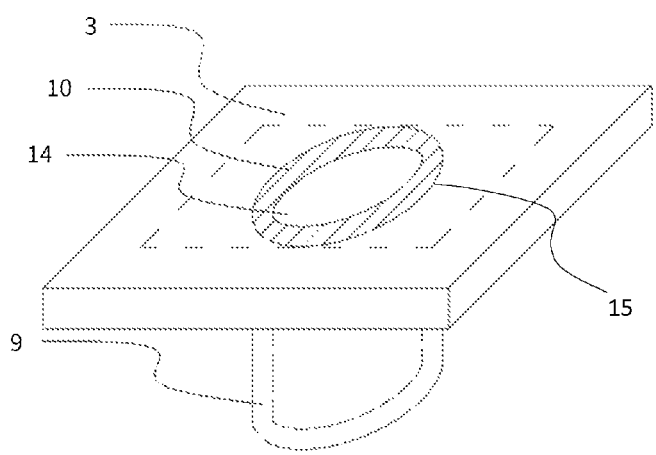
FIG. 12 shows the device according to FIG. 8 in a fifth embodiment.

As a further modification, it is also possible to provide the material platform 10 with an internal die 14 (FIG. 12). This allows a "cavity" to be created in which no material is used. One application for this is, for example, the production of ring-shaped components.

Figure 13:
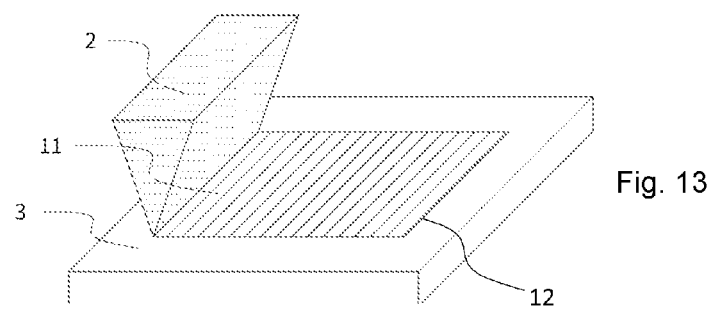
FIG. 13 shows a section of the device with the build platform and the doctor blade in a first embodiment.
Figure 14:
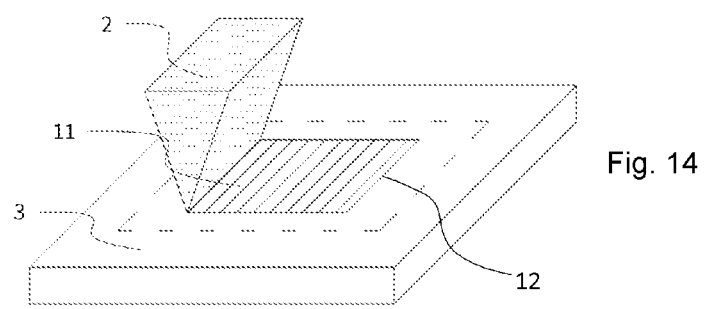
FIG. 14 shows the device according to FIG. 13 in a second embodiment.
Figure 15:
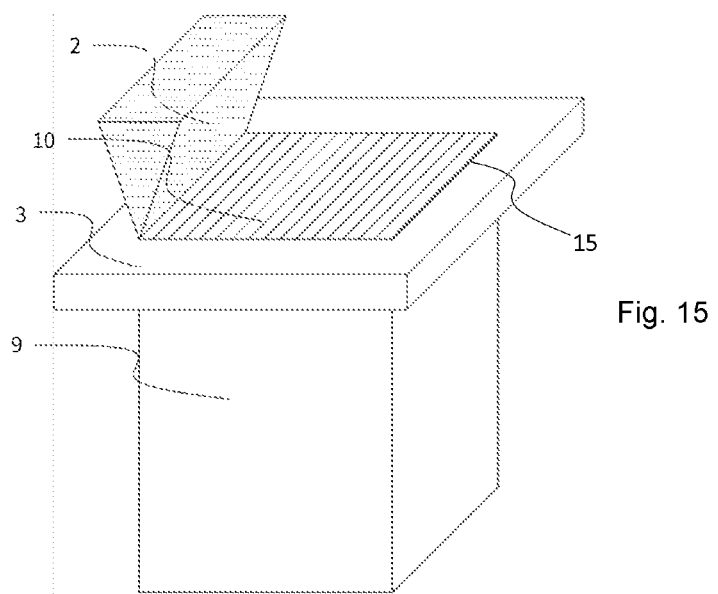
FIG. 15 shows a section of the device with the doctor blade, the material platform and the material container in a first embodiment.
Figure 16:
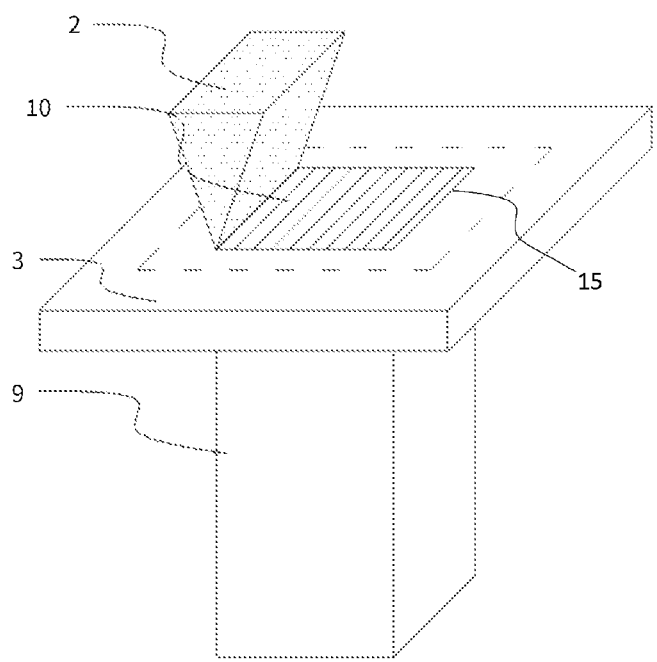
FIG. 16 shows the device according to FIG. 15 in a second embodiment.
Figure 17:
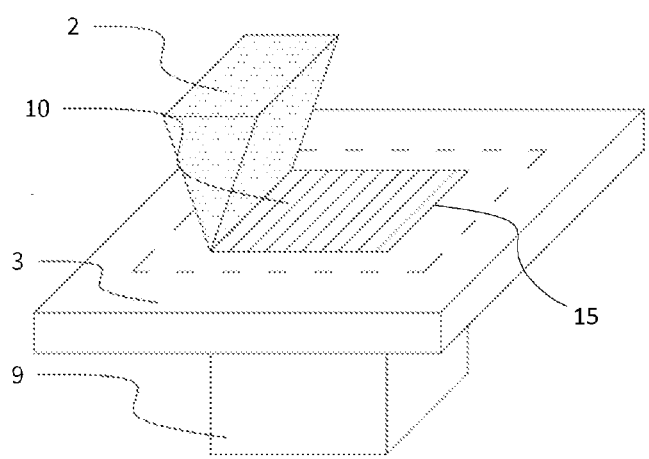
FIG. 17 shows the device according to FIG. 15 in a third embodiment.

FIGS. 13 to 17 show the adaptation of the doctor blade 2 to the size of the material platform 10 or the build platform 11. FIG. 13 shows a section of the material support 3 with the build platform 11 in the size according to FIGS. 1-4. In the embodiment according to FIG. 14, the doctor blade 2 is adapted to the dimension of the reduced build platform 11 in the y-direction. FIG. 15 shows a section of the material support 3 with the material platform 10 and the material container 9 in the original size. In the embodiment according to FIG. 16, the doctor blade 2 is adapted in the y-direction to the reduced size of the material platform 10 and the material container 9. The height of the material container 9 in the z-direction is unchanged in this embodiment. In the embodiment according to FIG. 17, however, the height of the material container 9 has also been reduced.

Figure 18:
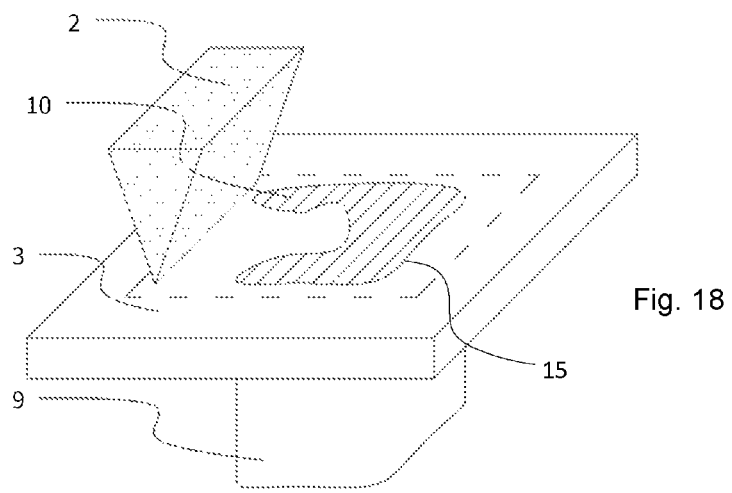
FIG. 18 shows the device according to FIG. 15 in a fourth embodiment.
Figure 19:
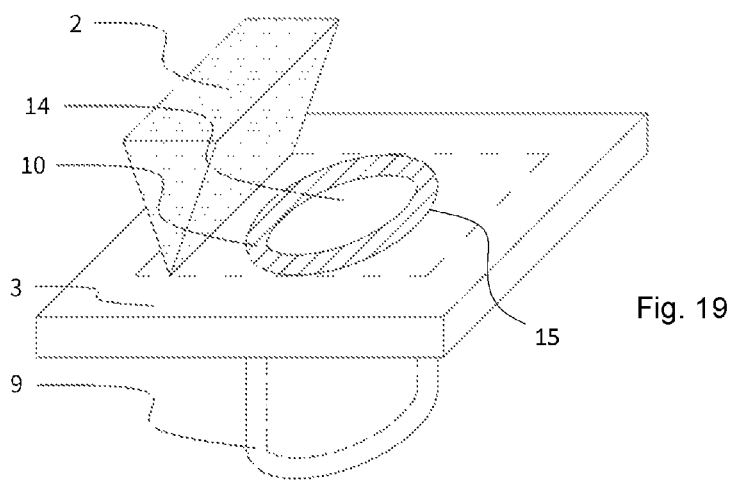
FIG. 19 shows the device according to FIG. 15 in a fifth embodiment.

FIG. 18 shows an adapted assembly in which the material platform 10 and the material container 9 are designed with a free form as in FIG. 11, and the doctor blade 2 is adapted to the size of the free form in the y-direction. FIG. 19 shows an adapted assembly in which the material platform 10 and the material container 9 are ring-shaped as in FIG. 12, and the doctor blade 2 is adapted to the size of the ring shape in the y-direction.

Figure 20:
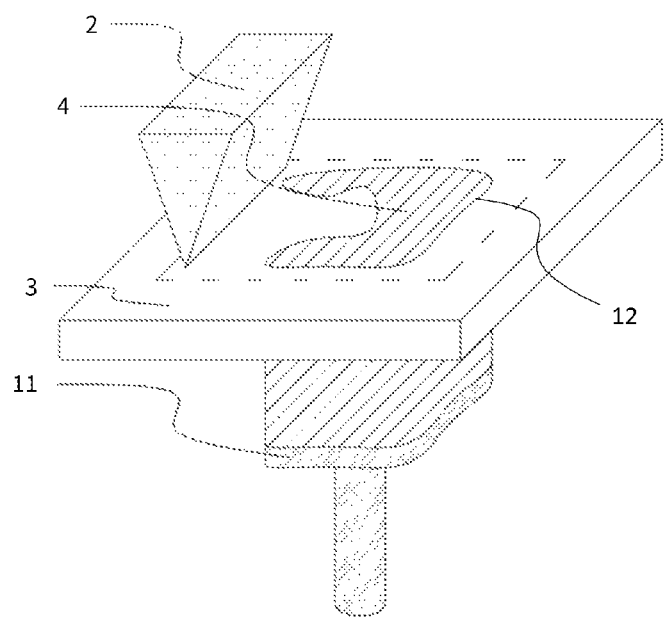
FIG. 20 shows a section of the device with the doctor blade and the build platform in a modified embodiment.

Due to the viscosity of the material, which is buttery or clay-like at room temperature, it is not necessary to use a material container with the build platform 11. However, this container can be retrofitted if necessary. An embodiment without container is shown in FIG. 20.

Figure 21:
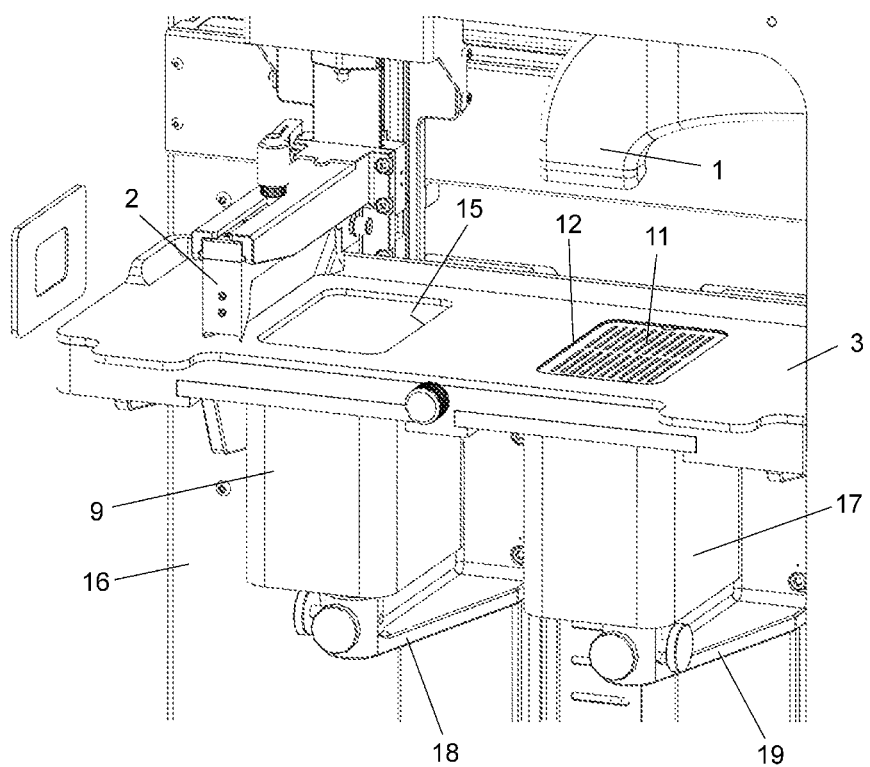
FIG. 21 shows a further embodiment of the device according to the invention.

With reference to the exemplary embodiment according to FIGS. 21-25, a design of the interchangeable arrangement of the material support 2, the material platform 10 and the build platform 11 is now shown. In FIG. 21, it can be seen that the material support 3 is replaceably attached to a vertical support 16. Furthermore, the material container 9 for fresh material is shown together with a lifting and lowering device 18 for lifting and lowering the material platform 10 which can be moved within the material container 9. A material container 17 is provided below the recess 12 for receiving the spent material lowered with the manufactured component. A lifting and lowering device 19 is provided for lowering and raising the build platform 11, which supports the build platform 11 that can be moved within the material container 17.

Figure 22:
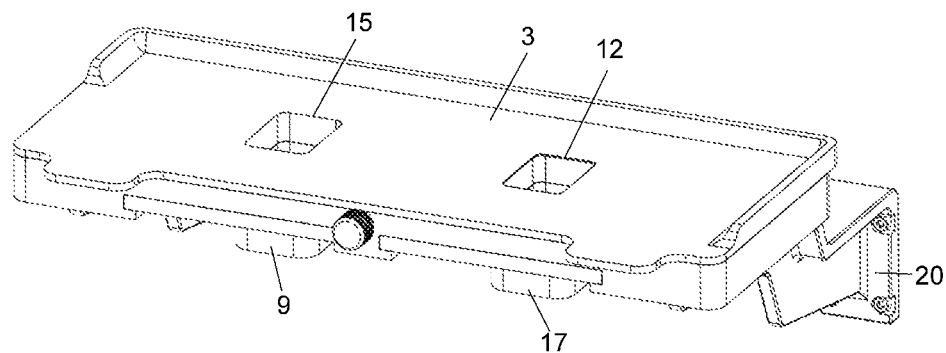
FIG. 22 shows a representation of a first embodiment of the material support of the device of FIG. 21.
Figure 23:
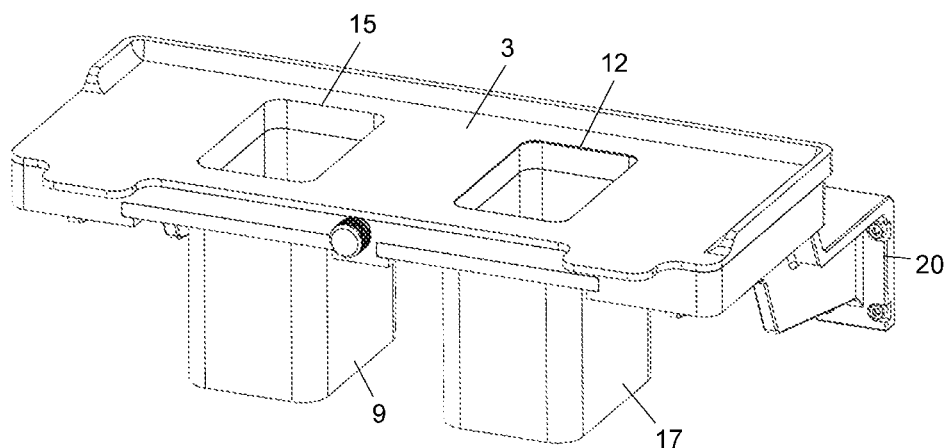
FIG. 23 shows a representation of a second embodiment of the material support of the device of FIG. 21.

In FIGS. 22 and 23, the interchangeable material support 3 is shown in two different embodiments, which differ in the size of the material feed opening 15, the recess 12, and the material containers 9 and 17. Furthermore, it can be seen that the material support 3 is equipped with mounting flanges 20 for exchangeable fastening to the carrier 16.

Figure 24:
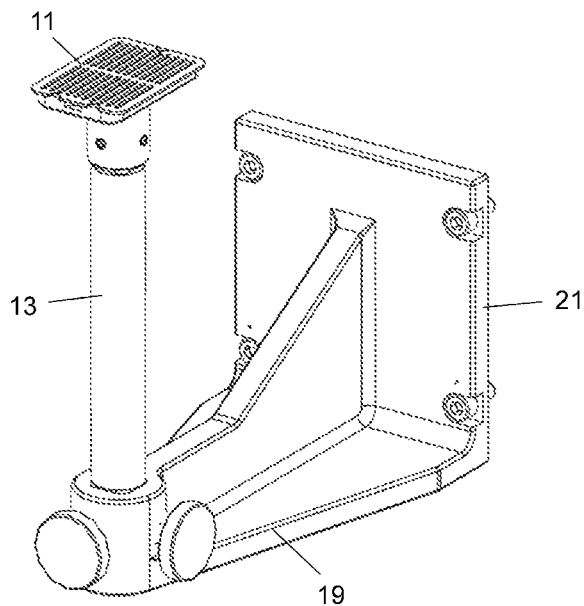
FIG. 24 shows a first embodiment of a build platform with a lifting and lowering device for the device according to FIG. 21.
Figure 25:
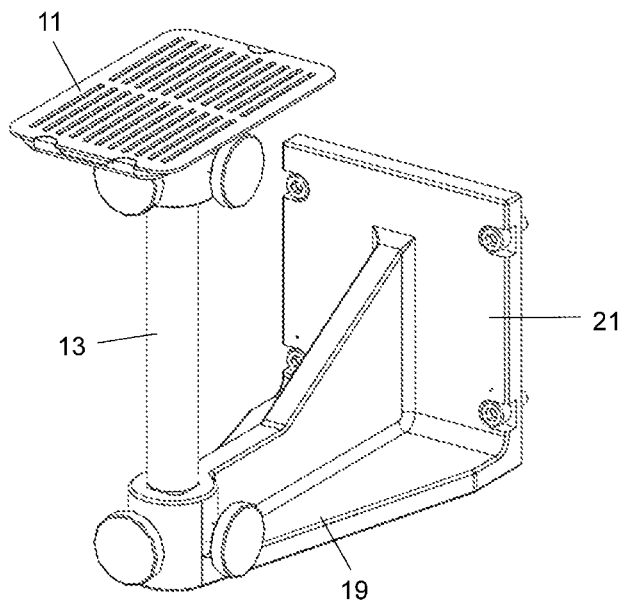
FIG. 25 shows a second embodiment of the build platform with a lifting and lowering device for the device according to FIG. 21.

In FIGS. 24 and 25, the lifting and lowering device 19 with the build platform 11 attached thereto is shown in two different embodiments, which differ in the size of the build platform 11. The lifting and lowering device 19 includes a mounting flange 21 for interchangeable attachment to the carrier 16.

The invention claimed is:

1. A device for stereolithographic additive manufacturing of metallic components, comprising:
a material support for supporting a material layer of a material to be polymerized, a surface of the material support forming a building plane, the material support forming a material feed opening and a recess corresponding to a shape of a build platform;
a material container for supplying the material, which opens into the building plane via the material feed opening;
the build platform is movable in a direction perpendicular to the building plane between a position flush with the building plane and a lowered position;
a doctor blade that is movable between the material container and the build platform for applying the material layer on the building plane; and
an exposure unit for position-selective exposure of the material layer on one of the build platform and a component partially built on the build platform;
wherein the material support is exchangeably arranged in the device; and
wherein no container for used material is arranged on the material support below the recess.

2. The device according to claim 1, wherein the material container is attached to the material support and is arranged below the material feed opening and is exchangeable together with the material support.

3. The device according to claim 2, wherein the material container comprises a cylindrical container wall and a container bottom configured as a displaceable piston.

4. The device according to claim 3, wherein a first lifting and lowering device is provided and cooperates with the container bottom for lifting and lowering the container bottom.

5. The device according to claim 4, wherein the first lifting and lowering device comprises a rod configured to be raised and lowered and to which the container bottom is interchangeably attached.

6. The device according to claim 4, wherein a second drivable lifting and lowering device is provided which cooperates with the build platform for raising and lowering the build platform.

7. The device according to claim 6, wherein the second drivable lifting and lowering device comprises a raiseable and lowerable rod to which the build platform is interchangeably attached.

8. The device according to claim 1, further comprising a holding unit drivable to reciprocate parallel to the building plane and to which the doctor blade is interchangeably attached.

9. A modular system for stereolithographic additive manufacturing of metallic components, comprising:
a device according to claim 1 with a first set and at least one further set;
wherein the first set comprises the material support, the build platform, and the doctor blade, and the at least one further set comprises a further material support, a further build platform and a further doctor blade, wherein one of the first set and the at least one further set can selectively be installed into the device; and
wherein the build platform of the first set and the further build platform of the at least one further set have at least one of different shapes and different dimensions from one another and the recess of the associated material support is adapted to one of the shape and dimensions of the respective build platform.

10. The modular system according to claim 9, wherein the material feed opening of the material support of the first set and the material feed opening of the material support of the at least one further set have at least one of different shapes and dimensions from each other.

11. The modular system according to claim 9, wherein the doctor blade of the first set and the further doctor blade of the at least one further set have different dimensions from each other.

12. A method for additively manufacturing a metallic component, comprising the steps of:
a) discharging an amount of material from a material container via a material feed opening into a building plane;
b) applying the amount of material by means of a doctor blade to form a material layer on a material support that extends from the material feed opening to over a build platform, the material support forming the material feed opening and a recess corresponding to a shape of the build platform;
c) selectively exposing the material layer by an exposure unit to obtain a position selectively polymerized component layer, an unpolymerized amount of material remaining surrounding the component layer; and d) lowering the build platform with the component layer and the unpolymerized amount of material;

wherein steps a) through d) are repeated to build up the component from a plurality of position-selectively polymerized component layers;

wherein, a first set and at least one further set are provided;

wherein the first set comprises the material support and the build platform and the at least one further set comprises a further material support and a further build platform;

wherein one of the first set and the at least one further set can selectively be installed into a manufacturing device;

wherein the build platform of the first set and the further build platform of the at least one further set have at least one of different shapes and different dimensions from one another and the recess of the associated material support is adapted to one of the shape and the dimensions of the respective build platform;

wherein the method further comprises selecting, prior to producing the component layers, such set from the first set and the at least one second set and installing said set in the device, in which the unpolymerized material quantity to be lowered with the build platform is smaller, taking into account the dimensions of the component to be built up; and wherein no container for used material is arranged on the material support below the recess.

13. The method according to claim 12, wherein the first set and the at least one further set each further comprise the doctor blade.

* * * * *